J. T. JOHNSON.
SHADE HOLDER.
APPLICATION FILED JUNE 19, 1918.
1,332,127.
Patented Feb. 24, 1920.
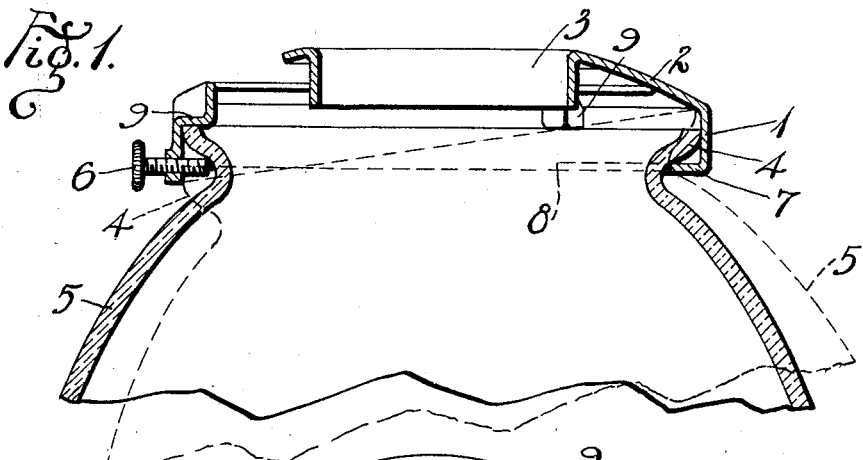
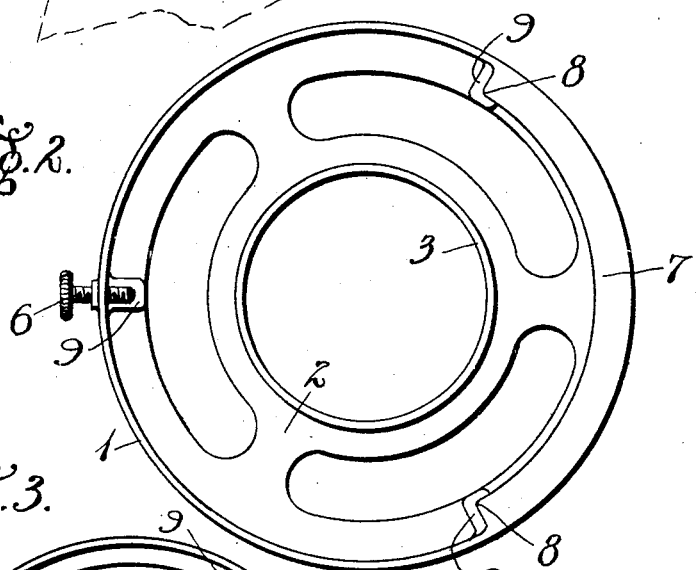
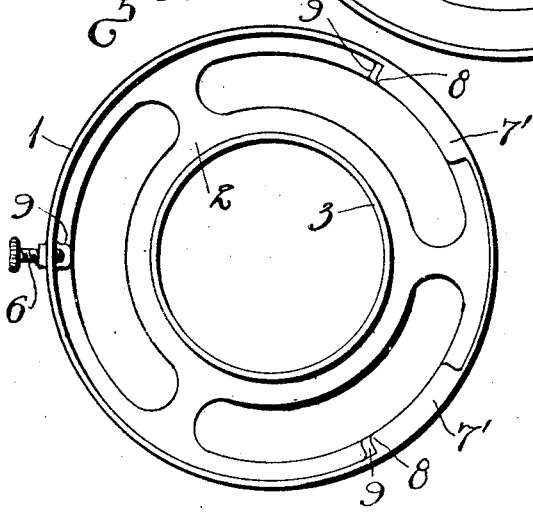
INVENTOR.
Jacob T. Johnson,
BY
Monroe E. Miller,
ATTORNEY.

UNITED STATES PATENT OFFICE.

JACOB T. JOHNSON, OF ATLANTA, GEORGIA.

SHADE-HOLDER.

1,332,127.   Specification of Letters Patent.   Patented Feb. 24, 1920.

Application filed June 19, 1918. Serial No. 240,721.

*To all whom it may concern:*

Be it known that I, JACOB T. JOHNSON, a citizen of the United States, and a resident of Atlanta, in the county of Fulton and State of Georgia, have invented certain new and useful Improvements in Shade-Holders, of which the following is a specification.

The present invention relates to light fixtures and more particularly to shade holders, such as are used upon electric, gas and other lamps for supporting shades.

It is the object of the invention to provide a shade holder provided with novel and extremely simple means for receiving and firmly holding any ordinary shade, with the use of but a single holding screw, and enabling the shade to be applied and removed quickly and conveniently.

A further object of the invention is the provision of such a holder which can be manufactured in any easy and inexpensive manner, which will be simple and cheap in construction, which will be compact so that it can be stored or shipped in small space, and which will be thoroughly reliable and efficient in use.

With the foregoing and other objects in view, which will be apparent as the invention is more fully understood, the invention resides in the construction and arrangement of parts as hereinafter described and claimed, it being understood that changes can be made within the scope of what is claimed without departing from the spirit of the invention.

The invention is illustrated in the accompanying drawing, wherein—

Figure 1 is a diametrical section of one form of shade holder with the shade applied.

Fig. 2 is a bottom plan view of said holder.

Fig. 3 is a similar view of a modification.

The holder comprises the annular gallery 1, top 2 and a concentric collar 3 or other suitable attachment for fastening the holder to an electric lamp socket, gas burner or other support. This holder can be readily stamped from sheet metal and may be made in various sizes and designs. The gallery 1 is of a diameter to snugly receive the outturned attaching lip 4 of the shade 5, this lip being the one now provided on shades according to the prevailing practice, so that the present holder can be used for such shades. The snug fit of the lip 4 in the gallery 1 serves to prevent the sidewise vibration of the shade in the holder, and a single securing screw 6 is threaded inwardly through the gallery 1, and constitutes the only fastening means that need be manipulated by hand in applying or removing the shade.

The gallery 1 is provided opposite to the screw 6 with an inturned arcuate lip or portion 7, which provides a fixed or rigid support for the lip 4, over which the lip 4 is inserted, while the screw 6 is moved inwardly under said lip to support the shade after it is assembled with the lip 7. The lip 7 extends through an arc of about 120 degrees, so that its end portions 8 and screw 6 are each arranged at an angle of about 120 degrees to the others.

In applying the shade, the screw 6 is unscrewed so that it does not project into the gallery, and the shade 5 is then applied in an angular position, as shown in dotted lines in Fig. 1, and is moved sidewise from under the screw 6, so as to move the lip 4 over the ends 8 of the lip 7. Then, when the shade is shifted to the dotted line position, it is swung into position, as seen in full lines in Fig. 1, the ends 8 of the lip 7 forming fulcrums on which the lip 4 turns as the shade is swung into place to move said lip completely into the gallery 1. The screw 6 is then screwed inwardly to project under the lip 4, which completes the attachment of the shade. The lip or portion 7 thus supports the lip or flange 4 of the shade through an arc of about 120 degrees, while the opposite portion of the lip 4 rests on the screw 6. To remove the shade, it is only necessary to unscrew the screw 6 which permits the corresponding side of the shade to swing downwardly, so that the shade can then be withdrawn sidewise.

Due to the fact that the shade must be swung on the end portions 8 and the lip 7 in applying or removing the shade, the top 2 of the holder must be spaced sufficiently above the lip 7 and the normal plane of the upper edge of the lip when seated on the lip 7 and screw 6, so that that portion of the lip 4 over the lip 7 can move upwardly, as seen in dotted lines in Fig. 1. With this arrangement, the upper edge or lip 4 of the shade cannot bear upwardly against top 2 of the holder, as in the ordinary holder using three screws, it being noted that the lip 4 is inclined so that inward pressure against it serves to raise said lip by cam action. In the ordinary holder using the three equally spaced screws, the pressure of the screws against the lip 4 will raise and clamp said lip against the top of the holder and in the present device, the screw 6 being tightened will, in bearing against the overhanging inclined lip 4, raise said lip by cam action, and also force the shade toward the lip 7, whereby the lip 4 in being forced over the lip 7 will also raise the shade. In this manner, the shade is raised into place with the same facility as in the ordinary holder. In order to take advantage of the upward thrust of the lip 4 by the tightening of the screw 5, to clamp the shade firmly to the holder to prevent rattling or vibration, the gallery 1 is provided with portions 9 instruck therefrom or otherwise provided thereon, and arranged for the contact of the lip 4 thereagainst when said lip is forced upwardly by the screw 6. As shown, there are three of these portions 9, two above the end portions 8 of the lip 7 and the other above the screw 6, but these portions 9 can be located at any suitable points, excepting over the lip 7 where the lip 4 must be free to swing upwardly without binding. By the provision of the lugs or portions 9, the lip 4 will be clamped against the portion 9 above the screw when said screw is tightened, and as the lip 4 is raised by sliding on the lip 7, it is raised against the other portions 9, thereby firmly holding the shade to the holder. Those portions 9 that are substantially above the end portions 8 of the lip 7 do not interfere with the lip or flange 4 of the shade as said lip can be readily slid over, slipped off of and swung on the lip 7 under said portions or lugs 9.

Fig. 3 shows the lip 7' as composed of two parts or ears instead of being continuous from end to end as in Fig. 2.

Having thus described the invention, what is claimed is:

A shade holder embodying a gallery, a single securing screw threaded inwardly through the gallery to engage behind the attaching lip of a shade, said gallery having a fixed inturned portion opposite to the screw providing a pair of fulcrums for said lip in swinging it into and out of the gallery past said screw, and the gallery having inwardly extending portions above said screw and fulcrums for the contact of said lip.

In testimony whereof, I hereunto set my hand this 17th day of June, 1918.

JACOB T. JOHNSON.